No. 654,499. Patented July 24, 1900.
L. VAUGHN, J. G. BLESSING & A. TUERK.
TIME STAMP.
(Application filed June 12, 1899.)
(No Model.) 9 Sheets—Sheet 1.

No. 654,499. Patented July 24, 1900.
L. VAUGHN, J. G. BLESSING & A. TUERK.
TIME STAMP.
(Application filed June 12, 1899.)
(No Model.) 9 Sheets—Sheet 2.

No. 654,499. Patented July 24, 1900.
L. VAUGHN, J. G. BLESSING & A. TUERK.
TIME STAMP.
(Application filed June 12, 1899.)
(No Model.) 9 Sheets—Sheet 5.

No. 654,499. Patented July 24, 1900.
L. VAUGHN, J. G. BLESSING & A. TUERK.
TIME STAMP.
(Application filed June 12, 1899.)
(No Model.) 9 Sheets—Sheet 6.

No. 654,499. Patented July 24, 1900.
L. VAUGHN, J. G. BLESSING & A. TUERK.
TIME STAMP.
(Application filed June 12, 1899.)
(No Model.) 9 Sheets—Sheet 7.

No. 654,499. Patented July 24, 1900.
L. VAUGHN, J. G. BLESSING & A. TUERK.
TIME STAMP.
(Application filed June 12, 1899.)
(No Model.) 9 Sheets—Sheet 8.

Fig. 17.

No. 654,499. Patented July 24, 1900.
L. VAUGHN, J. G. BLESSING & A. TUERK.
TIME STAMP.
(Application filed June 12, 1899.)
(No Model.) 9 Sheets—Sheet 9.

UNITED STATES PATENT OFFICE.

LINDSEY VAUGHN, JOHN G. BLESSING, AND ALBERT TUERK, OF CHICAGO, ILLINOIS; SAID VAUGHN AND BLESSING ASSIGNORS TO SAID TUERK.

TIME-STAMP.

SPECIFICATION forming part of Letters Patent No. 654,499, dated July 24, 1900.

Application filed June 12, 1899. Serial No. 720,235. (No model.)

*To all whom it may concern:*

Be it known that we, LINDSEY VAUGHN, JOHN G. BLESSING, and ALBERT TUERK, citizens of the United States of America, residing at Chicago, in the county of Cook, in the State of Illinois, have invented certain new and useful Improvements in Time-Stamps, of which the following is a description.

Referring to the accompanying drawings, wherein like reference letters and figures indicate like or corresponding parts, Fig. 4 is a side elevation taken on the opposite side of the time-stamp and having the side plate of the outer case removed and also the side plate of the movable frame of the registering mechanism removed. Figs. 13, 14, 15, 16, and 16$^a$ are detail views. Fig. 17 is a diagrammatic view of the registering-cams, showing their connections and relations to one another and the driving mechanism. Fig. 18 shows the dial and hand for setting the registering mechanism on the proper day and month.

This invention is in the nature of an improvement on the time-stamp shown and described in the patent to John G. Blessing, No. 602,026, dated April 5, 1898. In said patent there is shown and described a time-stamp in which the clock mechanism is provided with a series of cams which are adapted to regulate the adjustment of the registering mechanism, while the registering devices are normally wholly disconnected from the clock mechanism and coöperate with said cams only at the moment of operating the registering mechanism. Our invention is of this nature; and it consists in the novel construction, combination, and arrangement of parts herein shown and described, and more particularly pointed out in the claims.

In the drawings, A represents a base of suitable form supporting the clock mechanism assembled and retained in position between the plates B and B' and the stamp or registering mechanism retained in position within the frame C. (See Figs. 1 to 12, inclusive.) D D are outer plates inclosing the clock mechanism and forming a casing for the same. An inspection of these parts shows that the two mechanisms are not so connected as to be driven in unison by the clock-springs.

Figures 24, 25:
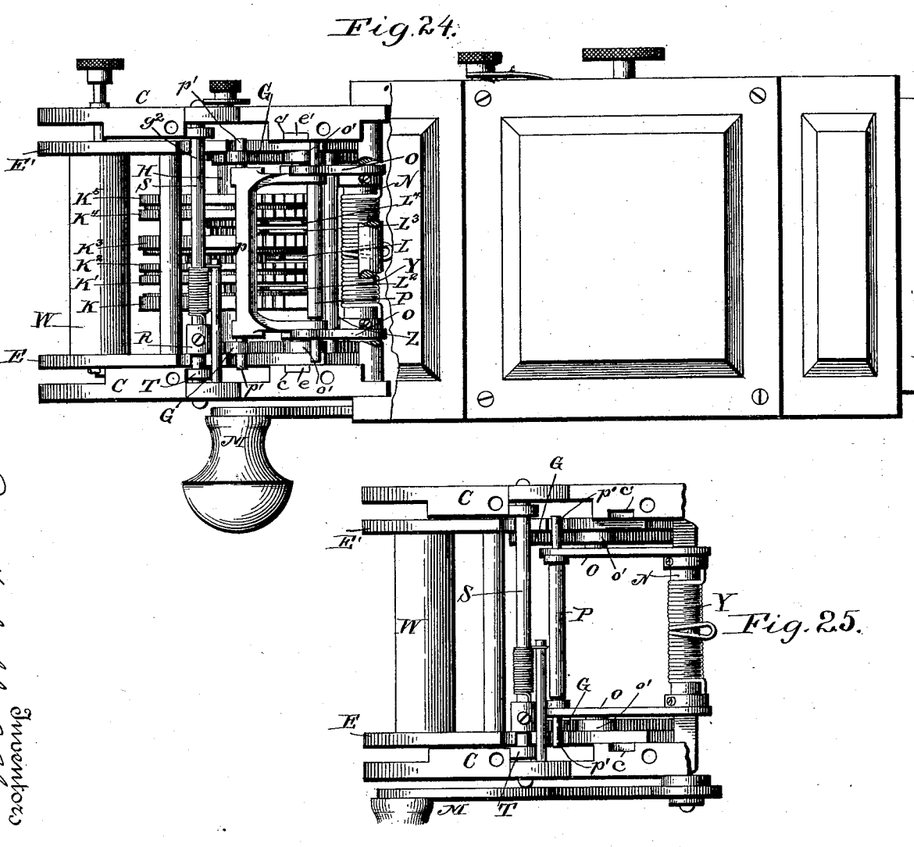
Fig. 24 is a plan view, the casing partly broken away to show the stamping mechanism, with the parts in normal position.
Fig. 25 is a similar view of part of the stamping mechanism with the parts in abnormal position.

Referring first to the registering or stamping mechanism, E E' are vertically-movable side plates retained in position and guided in their movements by guides e e', located within grooves c c', formed in the plates C. A shaft F, Figs. 3, 4, 10, and 11, connects the two plates E E' and pivotally supports the side arms G. A second shaft H, connecting the two side arms G, supports the several registering-wheels K K' K², &c., which are so arranged as to easily rotate thereon, Fig. 19. Between the side arms G, arranged upon the shaft F, is a series of levers L L' L², &c., the outer ends of which engage with the several registering-wheels in such a manner that the operation of the lever serves to rotate the registering-wheels, while the inner ends of the levers extend into the clock mechanism, where their movement is limited by cams or their equivalents driven by the clock mechanism. In the preferred construction the outer ends of the levers terminate in cog-racks $l\ l'\ l^2$, &c., meshing with pinions $k\ k'\ k^2$, &c., secured to the registering-wheels K K' K², &c. (See Figs. 3, 10, and 11.) A hand-lever M, secured to a rotatable shaft N, supported by the plates C, is arranged to control the vertical movement of the registering mechanism. In the preferred construction shown the transverse shaft N has fixedly mounted thereon arms O O, provided with slots $o$, through which loosely extends a shaft P. Antifriction-disks $o'$, Fig. 4, secured near the ends of the arms O, contact with the arms G, and upon operating the hand-lever, and consequently the arms O, aid in the initial depression of the arms G, as clearly shown in Figs. 10 and 11. The depression of the arms or plates G carries the register-wheels downward, and their operating-pinions being in contact with the cog-racks $l\ l'\ l^2$, &c., move the outer ends of the levers L L' L², &c., down until their inner or rear ends are moved up into engagement with the cams in the clock mechanism to be hereinafter described and are held thereby. (See Fig. 10.) Further downward movement of the arms G causes the pinions of the registering-wheels K K' K², &c., to rotate or roll on the cog-racks, thereby turning the registering-wheels into proper position. Depending from the shaft P is an alinement-bar $p$, having extending arms $p'$ near its lower extremity positioned in the slots $g$ of the arms or plates G. Such slot $g$ is so constructed that upon the initial downward movement the alinement-bar will not contact with the registering-wheels; but upon a further downward movement and after the wheels have been rotated it will be be permitted to come in contact with the periphery of the registering-wheels and be positioned in one of the depressions $l$ formed therein for that purpose, Figs. 3 and 4. Up to this point the supporting-plates E E' have not been disturbed, the several movements described being permitted without that effect. At this point, however, the downward movement of the hand-lever brings the end of the arm O in contact with the trip R, (shown in the dotted lines in Figs. 10 and 11,) and rotating the shaft S, on which it as well as the latch T are secured, presses backward the latch T from the catch U on the outer faces of the plates E E', which up to that moment have served to hold them in place, Figs. 2, 10, and 11. At this point the several registering-wheels are at their lower limit in the frame composed of the plates E E' and the connected parts, the alinement-arm is firmly positioned upon the top of the registering-wheels, and the extensions $g'$ on the plates G are resting firmly on pins or shoulders extending from the inner faces of the plates E E' for that purpose and indicated at $g^2$. (See Figs. 2 and 24.) The further downward movement of the lever M therefore depresses the plates E E' and their connecting parts, including the registering-wheels, so that the latter are forced into contact with a padded surface V, supported on the base A. The inked ribbon W, interposed between the periphery of the registering-wheels and the pad, causes the impression of the wheels to be registered upon any suitable article or substance placed on the pad. Upon releasing the lever M the springs X X, secured to the plates D D and at their free ends to the outer side of the plates E E', as by loops $x$, tend to throw the plates E E' upward into their normal position (see Fig. 2) and also return the several connected parts to their normal position. This is also assisted by the action of the spring Y, secured to the shaft N, Figs. 3, 10, and 11.

The transverse rod Z, extending from the plate E to the plate E' above the levers, serves to limit the movement of the levers L in one direction when the parts are in their normal position and to prevent the disconnection of the lever cog-racks $l\ l'\ l^2$, &c., from the pinions $k\ k'\ k^2$, &c., in one direction, while the rod Z', connecting the arms G G below the levers, serves a like purpose in the other direction. (See Figs. 3, 4, 10, and 11.) The two rods Z Z' are so positioned for this purpose that when the several parts are in their normal position the said rods lie close to the levers on opposite sides of the same, insuring their return to the same relative positions after each operation.

The registering-wheel consists of a wheel having upon its periphery the characters "A. M." and "P. M.," designating before noon and after noon, a registering-wheel indicating the units of minutes and another indicating the tens of minutes, a registering-wheel indicating the hour, and a registering-wheel indicating units of days and another tens of days. They are placed upon the shaft H in the order named, beginning at the right-hand side when facing that end of the device. Each of said registering-wheels is provided with an operating-lever, as stated. Thus the registering-wheel indicating "A. M." and "P. M.," which we have designated by the letter K, is operated by the lever L, the said lever mounted upon a sleeve embracing the shaft F preferably having its forward arm slotted and embracing a pin on the outer face of the wheel K, Figs. 19 and 20. Any movement of the said lever therefore actuates the said registering-wheel. The wheel K' is operated by the lever L', which is mounted upon the sleeve before referred to and provided on its outer end with the cog-rack $l'$, embracing a pinion $k'$ on the wheel, as before described. The registering-wheels K² K³ K⁴ are each provided with similar levers L², L³, L⁴, the two latter being mounted directly upon the shaft F, while the registering-wheel K⁵, indicating tens of days, is actuated by the lever L⁵, mounted directly upon the shaft F, but connected by the slot-and-pin arrangement similar to the registering-wheel K and lever L, before described, Fig. 19. The registering-wheel indicating the month and that indicating the year are preferably set by hand and are mounted in the frame connection of the plates E E' in a position to indicate the month and year when the machine is operated. The registering-wheel showing the year we have marked K⁶, (see Figs. 10 and 11,) while that registering the month is positioned on the opposite side of the machine in a similar position. (Not shown.) If preferred, all the registering-wheels and levers may be provided with a pinion and cog-rack construction; but as the two outer registering wheels have but a comparatively-limited rotation we prefer to employ the slot-and-pin construction described for those parts.

Figures 1, 21, 22, 23:
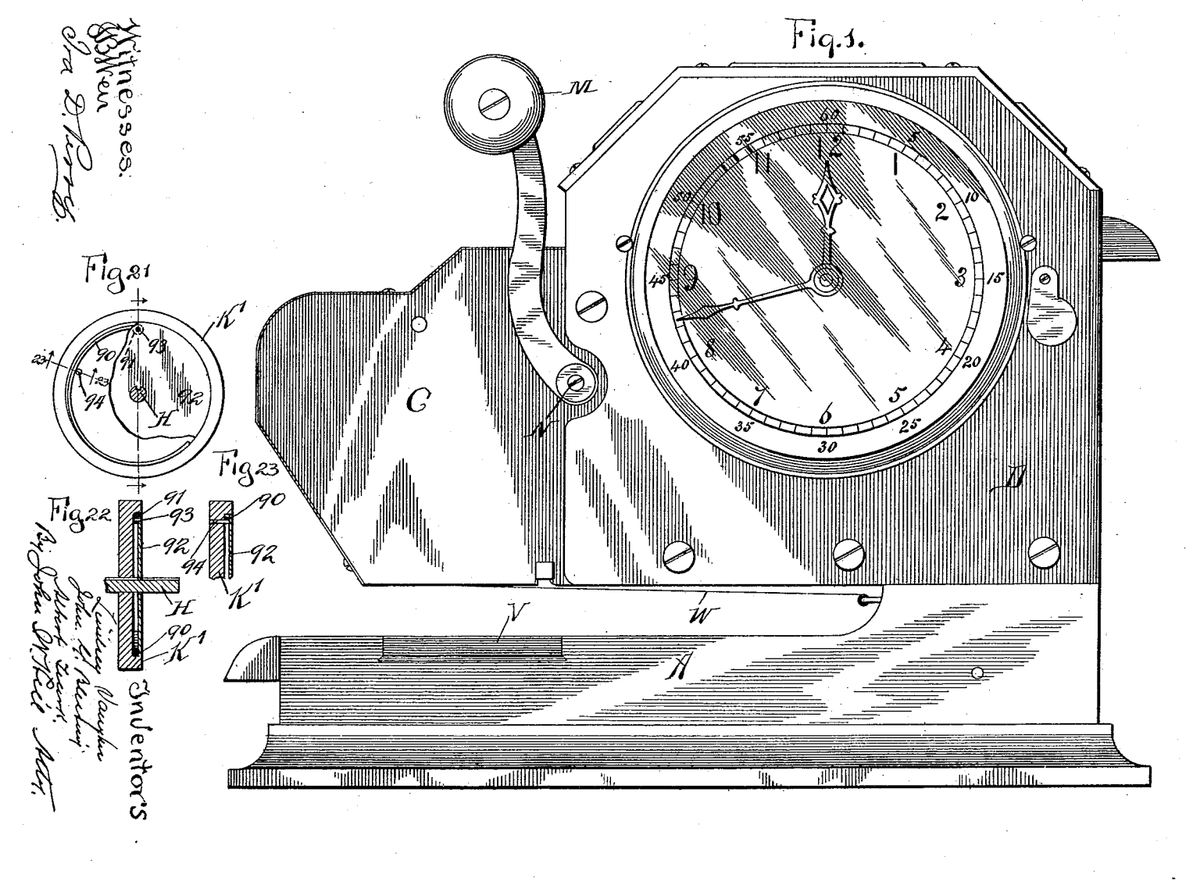
Figure 1 is a side elevation of our improved time-stamp.
Figs. 21, 22, and 23 are details of a preferred form of friction device for the registering-wheels K K', &c.

In the preferred construction we use means to gently brake the rotation of the wheels K K', &c. Thus, as shown in Figs. 21, 22, and 23, a spring 90 is placed within a recess or depression in the face of the wheel in such a manner as to spring outward and contact with the wall of the recess. A pin 94, fixed in the face of the wheel, holds the spring against the wall of the recess and causes it to follow the outer wall when the wheel is rotated. A plate 92, fixed on the shaft H and formed to loosely fit the circular recess in the wheel, is provided with a pin 93, which engages with one end of the spring, as by the loop or ring 91. As the plate 92 is secured to the shaft H, the rotation of the registering-wheels causes the spring to slidingly and frictionally engage the wall of the recess, forming an effective and gentle brake for the purpose set forth.

Referring now to the clock mechanism, 10 is a main shaft, upon which is mounted the wheel 11, inclosing a driving-spring, (not shown,) one end of which is secured to the outer portion of the wheel and the other to the shaft in the usual manner.

12 is a winding-pinion operated by the shaft 13, by means of which the wheel 11 is rotated to wind the spring, and thus the clock.

14 is a master-wheel mounted upon the same shaft 10 and provided with a similar spring, connected in a manner similar to that in wheel 11. Wheel 11 thus acts as the winding-wheel, also storing up reserve power by means of its spring, while the master-wheel 14 is mounted on the same shaft and provided with a similar spring which drives the clock mechanism. If preferred, however, a single wheel may be employed in the usual manner, as we claim nothing new in this particular.

Figure 5:
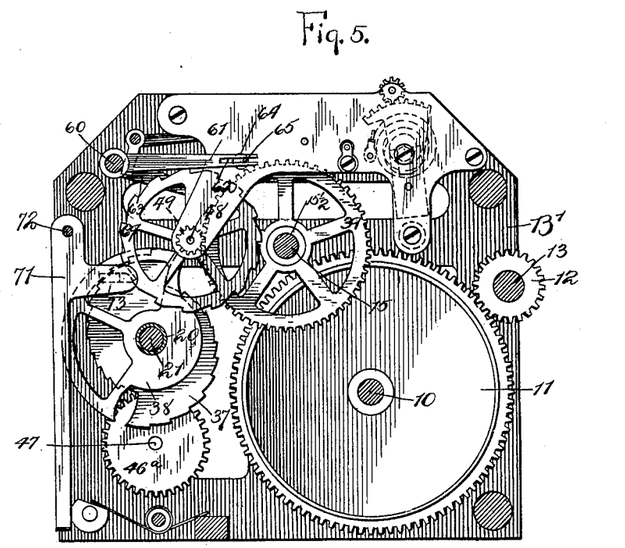
Fig. 5 is a vertical section of the clock mechanism in line 5 5 of Figs. 7 and 8.
Figure 6:
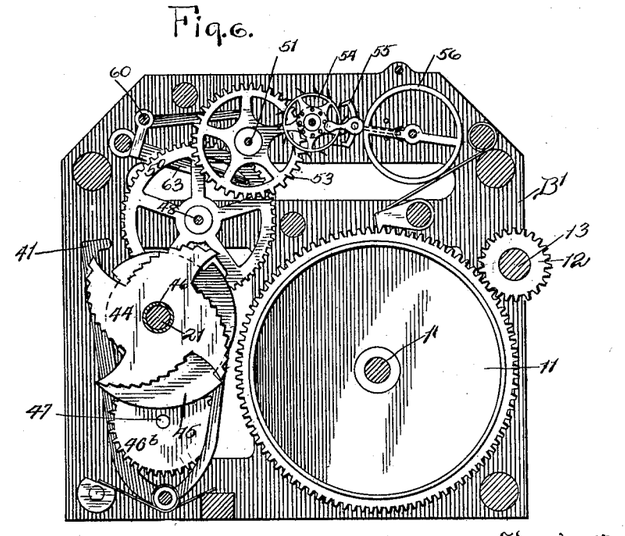
Fig. 6 is a similar section on line 6 6 of Fig. 8.

15 is a minute-shaft making a complete revolution once each hour and having mounted thereon a friction-sleeve or hollow shaft 15½, carrying the pinion 16, meshing with the master-wheel 14, (see Figs. 3 and 8,) and also carrying the pinion 39, hereinafter described, Figs. 5 and 8. On the outer side of the plate B a pinion 17, mounted on the minute-shaft 15 and secured thereto and driven thereby, drives the pinion 18, which in turn drives a pinion 19, mounted upon the hollow shaft or sleeve 20 on the shaft 21, (see Figs. 2, 7, and 12,) which shaft, as hereinafter described, carries the several cams for regulating the registering-lever mechanism before referred to. The several pinions are so constructed that the sleeve 20 is also timed to make a revolution once every hour. The sleeve 20 also carries the cam 22, regulating the registering of units of minutes, Figs. 3, 7, 10, 11, 12, and 17. The cam 22 is provided with six cam-arms, each having ten steps, as shown, and the lever L', having its free end lying in the same plane and being limited in its upward movement by one of said steps in one of the arms, regulates the downward limit of the cog-rack l', and consequently sets the registering-wheel K', registering the units of minutes. In the same manner the lever L², coacting with the cam 23, marks or registers the tens of minutes. A brake-wheel 24, secured to the sleeve 20, and the spring-latch 28, engaging with the notches in the periphery of the brake-wheel, insures the proper positioning of the sleeves and cams 22 and 23 at the end of each minute, as will be more fully explained hereinafter, Figs. 2, 7, and 12. A pinion 26, secured to and rotating with the pinion 18, meshes with the pinion 27, loosely mounted on the minute-shaft 15, and carries the hour-hand, which is of course timed to make a revolution once every twelve hours, Figs. 2 and 17. On the other side of the clock mechanism the minute-shaft 15 has fixed to it a cam 28. (See Figs. 4 and 17.) The sleeve 15½ extends through the plate B' and has fixed thereto a brake-wheel 29, preferably provided with sixty teeth. A spring-latch 30, secured to the shaft 15, engages with one of the teeth or indentations in the wheel 29. Thus upon turning the shaft to set the clock it will be set a full minute in each case, thus properly adjusting the minute-cams 22 23.

A lever 31, pivotally connected to the clock-plate B' at 32, has its free end resting upon the cam 28 and is alternately raised and released by the rotation of said cam. A spring-latch 33, pivotally secured to the lever 31, engages with the teeth or indentations in the wheel 34, which is secured to the shaft 21 and drives the same. The wheel 34 is provided with twenty-four teeth or indentations on its periphery. Hence as said minute-shaft 15 and cam 28 rotate once each hour and at each revolution thereof the wheel 34 is advanced one notch the said wheel 34 and shaft 21 will make one complete revolution once every twenty-four hours. In the preferred form a pin or equivalent part 35 on the lever also engages with the teeth on the wheel 34 and gives additional assurance of the perfect working of the parts, while the spring-latch 36, engaging with the wheel 34 on its opposite side, prevents any accidental displacement of the same during the operation described. (See Figs. 4 and 17.) Cam 37, having two arms with twelve steps each, controlling the registering of the hour and the cam 38, controlling the registering of "A. M." and "P. M.," (see Figs. 12 and 17,) are also securely fixed to the shaft 21 and rotate therewith. Thus the lever L, controlling the wheel K, registering "A. M." and "P. M.," is regulated by the cam 38, while lever $L^3$, controlling the wheel $K^3$, registering the hour, is regulated by the cam 37.

A short piece extending through the case and removably attached to the minute-shaft 15 permits the latter to be rotated and the clock to be set forward as desired, as in setting a clock forward, by means of the minute-hand. In the preferred construction, however, we construct the cam 28 with two shoulders, which when it is attempted to set the clock backward will permit such setting only to a limited extent, the said shoulders thereupon contacting with the end of the lever 31 and preventing further movement in that direction. This provision prevents variance between the setting of the clock and of the hour-cam 38. Otherwise when the parts occupy the position shown in Fig. 4 setting the clock backward would result in advancing the hour-cam one notch, the latch 23 engaging with the wheel 34 with that result, while the hands of the clock would be set backward. The result would be a variance of at least two hours between the time indicated by the face of the clock and the time registered.

Figures 2, 12:
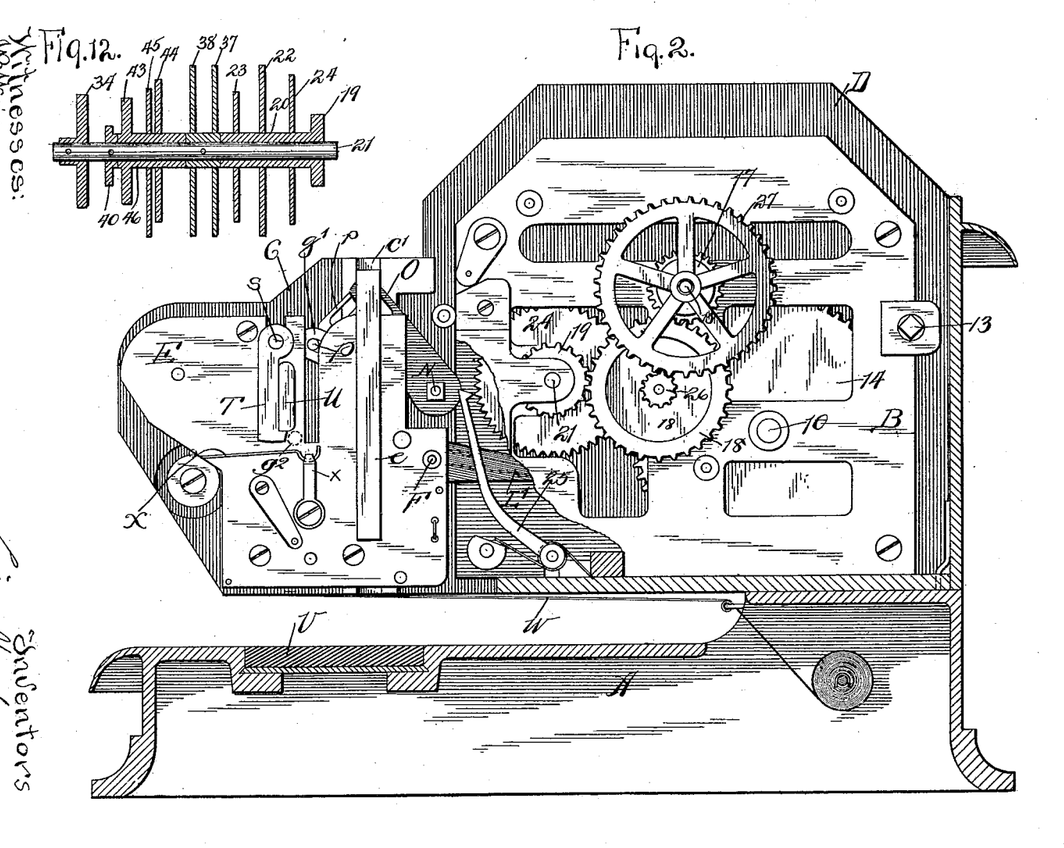
Fig. 2 is a similar elevation with the side plate of the outer case removed.
Fig. 12 is a longitudinal section of the shaft carrying the registering-cams and shaft driving the same.
Figures 3, 19:
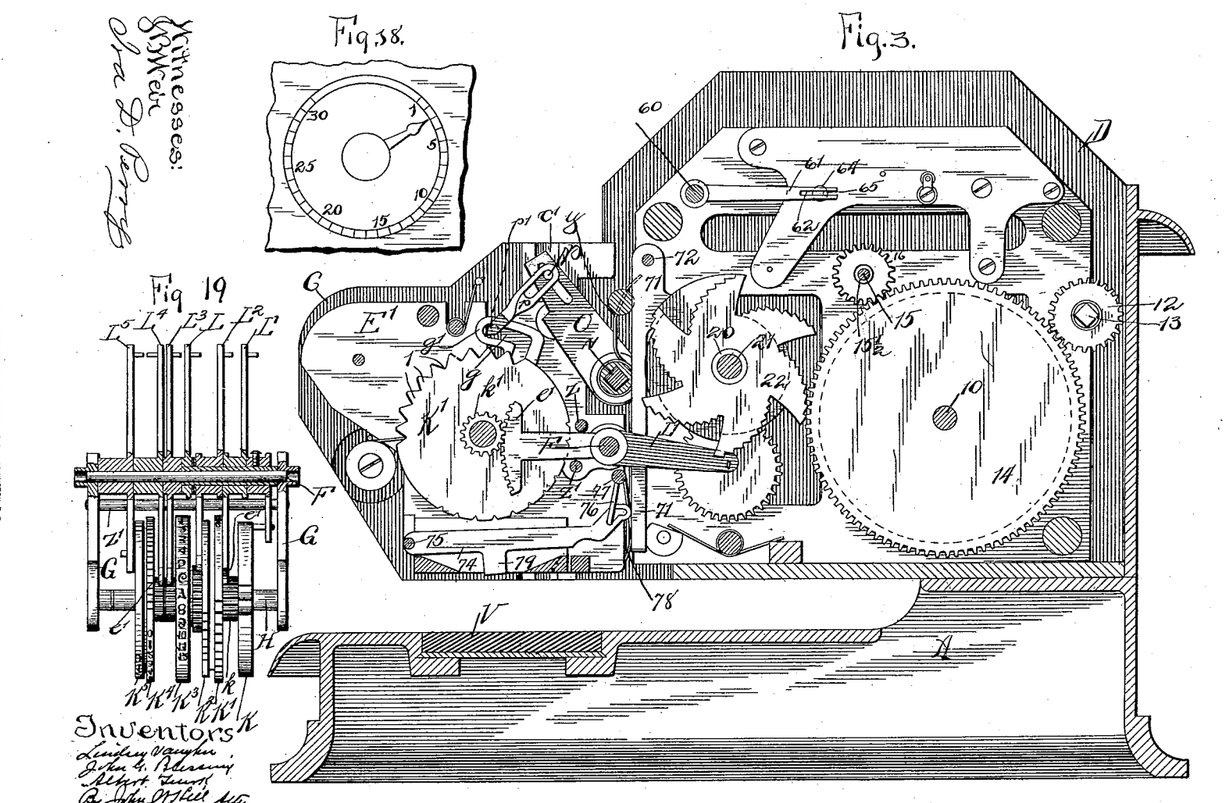
Fig. 3 is a vertical section in line 3 3 of Figs. 7 and 8 continued through the registering mechanism.
Fig. 19 is a plan view and partial section of the registering-wheels and operating-levers.
Figures 4, 13, 14, 15, 16, 16A:
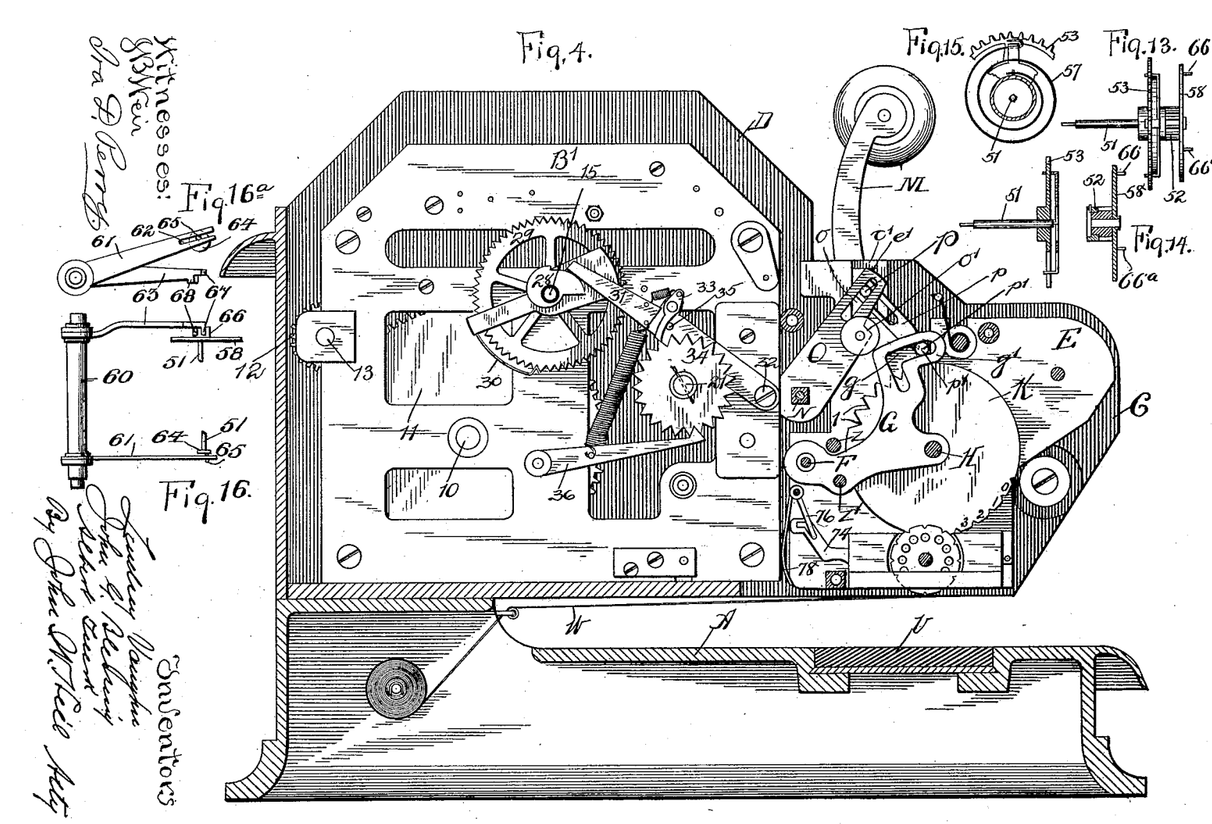
Figures 7, 8, 9, 20:
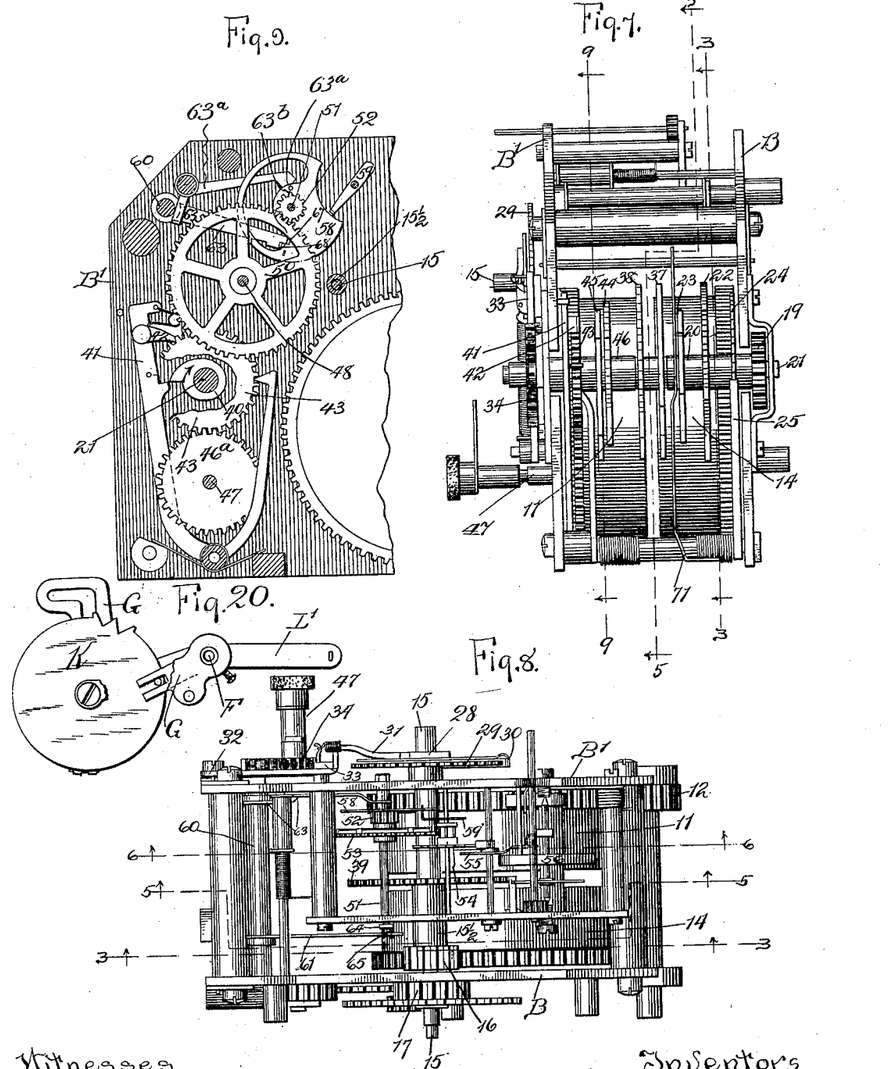
Fig. 7 is a partial front view of the clock mechanism, showing the location of the registering-cams.
Fig. 8 is a partial top plan of the clock mechanism. (Registering-cams not shown.)
Fig. 9 is a partial vertical section in line 9 9 of Fig. 7 with the parts broken away to show the construction and arrangement.
Fig. 20 is a side elevation of the registering-wheel K, showing the preferred form of connection to the operating-lever.

Fixed to the shaft 21 just inside the plate B' is also a cam 40, Figs. 9, 12, and 17, making a complete revolution with said shaft once in twenty-four hours. The spring-lever 41 coacting with said cam reciprocates at its free end, causing the latch 42 to engage with the teeth or indentations in the periphery of the pinion 43, regularly advancing it one notch every day of twenty-four hours. The wheel 43, as well as the cam 44, controlling the movement of the lever $L^4$, and hence the wheel $K^4$, registering the units of days, and the cam 45, controlling the lever $L^5$, and hence the wheel $K^5$, registering the tens of days, are mounted on a sleeve 46, rotatably mounted on the shaft 21. (See Figs. 12 and 17.) Hence it will be readily seen that the said cams 44 and 45 are regularly set by the said cam action each twenty-four hours and mark the day of the month. A pinion $46^a$, mounted on the stub-shaft 47, meshing with the wheel 43, permits the mechanism to be readily set to register any given day, as in the beginning of a new month, by rotating the shaft 47.

Figure 10:
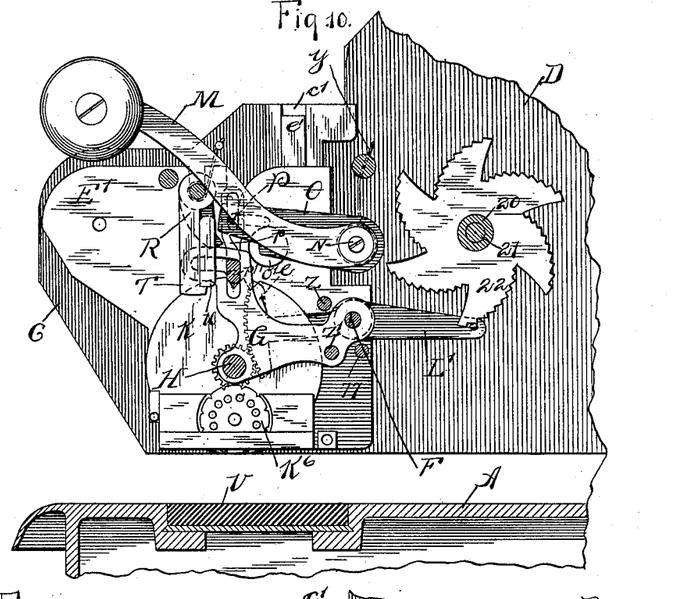
Fig. 10 is a central longitudinal vertical section through the registering mechanism and a part of the clock mechanism, showing the position of the parts at the moment when the registering-wheels are set.
Figure 11:
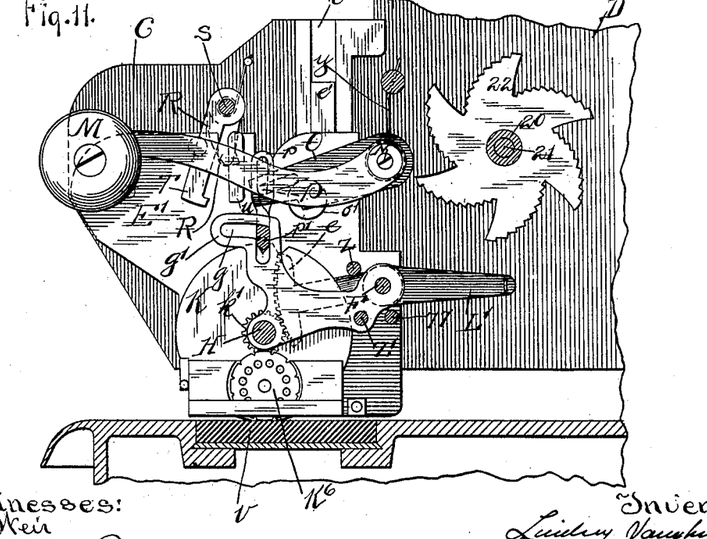
Fig. 11 is the same section showing the position of the parts at the moment when the registering device is depressed for the purpose of making an impression.

In our improved time-stamp, as in that shown and described in Patent No. 602,026 to Blessing, before referred to, we prefer to so construct the clock mechanism that it will stand inactive for an interval of time—say one minute—and will then quickly advance the several parts sufficiently to mark that interval. To this end we arrange a supplemental train to continue the operation of the clock during the said interval, which train is energized by the clock mechanism. For this purpose the pinion 39, before referred to, Figs. 5 and 8, drives shaft 48 by means of the small pinion 49, fixed thereto and meshing with the pinion 39, Fig. 5. Firmly fixed to the shaft 48 and rotating therewith is a gear 50, Fig. 9, driving a pinion 52, meshing therewith and loose on shaft 51. Fixedly mounted on the shaft 51 is a gear 53, the driving member of the train 54, 55, and 56, Fig. 6, also Figs. 13, 14, and 15. A coiled spring 57, secured at one end to the pinion 52 and at the other to the gear 53, Figs. 15 and 17, serves to energize the said train. A disk 58 or an equivalent part fixed to the pinion 52 and rotating therewith is constructed to normally permit the revolution of a stop 59, mounted upon the shaft carrying the escapement-wheel 54 of the train. Upon a partial revolution of said disk, however, the said stop 59 will come in contact with the periphery of the disk and stop the train, and thus the clock. A pivotally-mounted rod or shaft 60 has fixed to it an arm 61, provided with a slot 62 near its free end, and an arm 63, having its free end constructed to form a stop, Figs. 8 and 9. The shaft 51, Figs. 8, 9, and 10, is provided on its end with a crank-arm or wrist-pin construction. In the form shown a small disk 64 is provided with a wrist-pin 65, which is normally located in the slot 62, and upon the rotation of said shaft imparts to the end of the arm 61 an oscillation which is transmitted to the stop-arm 63, causing its free end to also oscillate. A pin 66 extends from the face of the disk 58 in a position to coact with the stop on the end of the arm 63, Figs. 8, 9, and 17.

The mode of operation is as follows: The pinion 52 and disk 58 are driven one revolution by the gear 50 until pin 66 engages stop-arm 63, and the tension thereby put on the spring 57 drives the gear 53 and escapement-wheel 54, with its train, for the time necessary to allow the shaft 51 to make a complete revolution, the rest of the clock mechanism standing inactive during that interval, which is preferably one minute. The rotation of the said shaft causes the free end of the arm 61 first to be lifted and transmits that movement to the free end of the arm 63 until the part 67 of the stop is freed from the pin 66, which immediately contacts with the parts 68. Upon the downward movement of the arm 61 the arm 63 moves correspondingly and the part 68 disengages from the pin 66, the pin passing through between the two parts 67 and 68, when the master-wheel 14 quickly drives the entire clock mechanism forward causing the pinion 52 and disk 58 to make a complete revolution and bringing the pin 66 again in contact with the part 67 of the stop on the end of the arm 63. This action drives the entire clock mechanism forward sufficiently to properly mark the said interval of time upon the dial and to place sufficient strain upon the spring 57 to again energize the train for the next interval of time. It also effects the instantaneous and accurate setting of the several cam-wheels.

66ª indicates another pin on the disk 58, adapted in the forward movement of the disk to lift and pass an arm or detent 63ª, which by means of a shoulder 63ᵇ holds the disk from back movement, thereby preventing oscillation of the disk.

If at any time the clock has not sufficient energy to drive the mechanism forward to cause the shaft 51 to make a complete revolution, the disk 58 will only make a partial revolution and the stop 59 will contact with the periphery thereof, stopping the train and clock, and thus preventing the entire relaxation of the spring 57.

In the preferred form we employ the dual construction and operation of the stops 67 and 68 to also register the half-minutes. To this end we securely mount the cam-wheel 69 on the shaft 48 and construct upon its periphery a series of cams 70. The lever 71, pivotally supported at 72, is provided with an extension or arm 73, contacting with the cams 70. At the moment the stop 67 is in contact with the pin 66 the extension 73 rests upon the top of one of the cams 70; but when that stop disengages the pin 66 and the stop 68 engages said pin the cam-wheel 69 is thereby rotated sufficiently to bring the depression between two projections 70 into engagement with the arm 73. (See Fig. 17.) This action causes the free end of the lever 71 to reciprocate back and forth. In the preferred construction shown gravity is sufficient to insure the proper engagement of those parts, though a spring may be employed, if preferred. Within the registering mechanism is a lever 74, pivotally connected to the frame at 75, while its free end is slotted to engage with the hook-arm 76, pivotally supported by the shaft or rod 77. A depending arm 78 is formed to contact with the free end of the lever 71. (See Fig. 3.) A central projection 79, having upon its lower extremity the character "½," extends downward from the lever 74 to a point which when at its lower limit is in line with the lower surfaces of the registering-wheels. When the parts are in the full-minute position, the lever 74 is elevated by reason of the form of the slot in the free end of the lever, (see Fig. 3,) when "½" minute will not register. When, however, the parts are in the half-minute position and the stop 68 is in contact with the pin 66, the free end of the lever 71 swings backward and the lever 74 falls to its registering position, the form of the slot therein causing it to be firmly held in that position.

It is obvious that after describing our improvement modifications may be made without departing from the spirit of our invention. Hence we do not wish to be understood as limiting ourselves to the exact construction shown.

Having thus described our invention, what we claim as new, and desire to secure by Letters Patent, is—

1. In a device of the kind described, the clock mechanism provided with means for regulating the movement of register-controlling levers, in combination with a movable frame, carrying registering-wheels K, K', &c., provided with pinions $k$, $k'$, &c., register-controlling levers L, L', &c., pivotally supported between their ends, and provided at one end with cog-racks $l$, $l'$, &c., meshing with the pinions $k$, $k'$, &c., and at the other end with means for coacting with the lever-controlling mechanism in the clock, and means for depressing the registering-frame at will.

2. In a device of the kind described, the clock mechanism provided with cams for regulating the movement of register-controlling levers, in combination with a movable frame carrying registering-wheels K, K', &c., provided with pinions $k$, $k'$, &c., and also register-controlling levers L, L', &c., provided at one end with teeth coacting with the pinions $k$, $k'$, &c., and at the other end with the cams in the clock mechanism, and means for depressing the registering mechanism at will.

3. In a device of the kind described, a clock mechanism provided with cams for regulating the movement of the register-controlling levers, in combination with a movable frame carrying registering-wheels thereon, provided with pinions $k$, $k'$, and also carrying register-controlling levers pivotally supported between their ends and provided at one end with means adapted to coact with the pinions $k$, $k'$, to set the registering-wheels and at the other end provided with means for coacting with the controlling-cams means for firmly holding the registering-wheels in alinement when set, and means for depressing the registering-wheels at will.

4. In a device of the kind described, a registering mechanism comprising a movable frame E E', pivoted arms G G, carried by the frame and each provided with the slot $g$, the registering-wheels K, K', &c., mounted on the shaft H, carried by arms G, G, the arm O, mounted on the shaft N for depressing arms G, G, and the alinement-bar P $p'$, having portions engaging in said slots $g$, $g$, the register-controlling levers L, L', &c., and the hand-lever M for operating shaft N, in combination with a clock mechanism provided with cams arranged to limit the movement of the free ends of the levers L, L', &c., substantially as described.

5. In a device of the kind described, registering mechanism comprising the plates E, E', vertically movable in guides, and normally retained at their upper limit, arms G, G, pivotally mounted on the shaft F carried by the plates E, E', the shaft H carried by arms G, G and carrying the registering-wheels K, K', &c., the levers L, L', &c., pivotally mounted on the shaft F, and adapted to control the setting of the registering-wheels, means for retaining the registering-wheels in alinement when set, and means for depressing the registering mechanism at will, in combination with the clock mechanism provided with cams to limit the movement of the levers L, L', &c., substantially as described.

6. In a device of the kind described, the registering mechanism comprising the vertically-movable plates E, E', carrying the shaft F, the arms G, G, pivotally mounted on said shaft, the shaft H carried by the arms G G and carrying the registering-wheels K, K', &c., levers L, L' pivotally mounted on the shaft F and coacting with the registering-wheels, the rods Z, Z', means for depressing the registering mechanism at will and means for retaining the registering-wheels in true alinement when so depressed, in combination with the clock mechanism provided with cam-wheels adapted to regulate the movement of the several levers L, L', substantially as described.

7. In a device of the kind described, the combination of the following elements: the registering mechanism consisting of the wheels K, K', &c., provided with pinions k, k', &c., levers L, L', &c., provided with cog-racks adapted to coact with the pinions k, k', &c., to set the registering-wheels, means for depressing the registering-wheels at will and holding them in alinement when so depressed, clock mechanism provided with a controlling-train whereby the clock remains inactive at regular intervals, and cams arranged to coact with the levers L, L', &c., to regulate their limit of movement, substantially as and for the purpose set forth.

8. In a device of the kind described, the registering mechanism comprising the wheels K, K', &c., provided with means for gently braking their rotation, levers L, L', &c., provided with teeth at one end adapted to coact with pinions secured to the registering-wheels to effect their setting and at the other end adapted to coact with regulating means in the clock mechanism, and means for depressing the registering-wheels at will, in combination with the clock mechanism provided with means for coacting with the free end of the levers L, L', &c., substantially as and for the purpose described.

9. In a device of the kind described, one or more of the registering-wheels K, K', &c., provided with a spring-brake consisting of the spring 90 constructed to frictionally contact with a part of the registering-wheel for that purpose, in combination with a plate 92 constructed to coöperate with said spring, substantially as described.

10. In a device of the kind described, a clock mechanism constructed to indicate the time upon its face in the usual manner and provided with cams 22, 23, 37, 38, 44, and 45 and connecting mechanism for regulating the movement of said cams, in combination with registering mechanism comprising a series of registering-wheels mounted in a vertically-movable frame, means for depressing the frame, and means operated by the frame, depressing means for rotating the registering-wheels and a series of levers L, L', &c., normally free from connection with the clock mechanism and arranged to control the rotation of the registering-wheel, but upon depressing the registering mechanism momentarily contacting with the several cams referred to, substantially as and for the purpose set forth.

11. In a machine of the kind described, the combination of registering devices, means for moving said devices to make the impression, mechanism operated by said means for positively setting said registering devices into proper relative position, register-controlling levers for said devices, a clock mechanism provided with controlling devices for said register-controlling levers, and a controlling-train for rendering the clock mechanism inactive at regular intervals, substantially as described.

12. In a machine of the kind described, a controlling-train for the purpose described, comprising a driven pinion 52, a gear 53 connected to said pinion by a spring, an escapement 54, 55 and 56 driven by said gear 53, an arm 61 oscillated by connections between the same and gear 53, an arm 63 connected to and movable with arm 61, and adapted to coact with a part to stop said pinion 52, substantially as described.

13. In a machine of the kind described, a clock mechanism provided with a minute-shaft, a sleeve thereon, a brake-wheel carried by said sleeve, a spring-pressed latch carried by the minute-shaft and engaging said brake-wheel, a cam 28 secured to the minute-shaft, a lever 31 operated by said cam, a latch carried by said lever, and a wheel 34 operated by said lever, substantially as and for the purpose set forth.

14. In a device of the kind described, the clock mechanism provided with the brake-wheel 29, secured to a sleeve mounted upon the minute-shaft 15, the latch 30 secured to and rotating with the minute-shaft, and the cam secured to the minute-shaft 28 provided with two shoulders as described, in combination with the lever 31, latch 33 carried thereby, wheel 34, operated by said latch, regulating the setting of one or more lever-setting devices, and lever 36 engaging said wheel 34, substantially as and for the purpose set forth.

15. In a device of the kind described, the clock mechanism provided with an interval-controlling train constructed to make a limited advance when one-half the interval has elapsed, and a cam 69 and connections with said train arranged to move and mark the partial advance and also the complete advance at the end of the interval, and the lever 71 constructed to coact with said cam-wheel, in combination with a lever 74 provided with a projection 79, indicating the one-half interval, and means for imparting the reciprocating action of the end of the lever 71, to the lever 74, to alternately raise and lower the same, substantially as and for the purpose set forth.

16. In a machine of the kind described, the combination with an interval-controlling train, of a cam, connections between the same and said train for permitting the movement of the cam intermittently, a lever 71 coacting with said cam causing the free end of the lever to oscillate, a lever 74 provided with an indicating portion 79, and means for imparting the movement of lever 71 to lever 74 comprising a shaft 77, and arms 76 and 78 connected thereto, substantially as described.

17. In a machine of the kind described, a clock mechanism provided with means for regulating the movement of register-controlling devices, in combination with registering devices controlled by said register-controlling devices, means for moving the registering devices to make the impression and mechanism positively operated by said means for positively setting said registering devices, substantially as described.

LINDSEY VAUGHN.
JOHN G. BLESSING.
ALBERT TUERK.

Witnesses:
LEONORA WISEMAN,
BESSIE SHADLOTT.